United States Patent
Yang et al.

(10) Patent No.: US 7,402,627 B2
(45) Date of Patent: Jul. 22, 2008

(54) PRECURSOR COLORANT COMPOSITION FOR LATEX PAINT

(75) Inventors: Yong Yang, Piscataway, NJ (US); Mohammad Asif, Middletown, NJ (US); Robert J. Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 33 days.

(21) Appl. No.: 10/728,599

(22) Filed: Dec. 4, 2003

(65) Prior Publication Data

US 2005/0039635 A1 Feb. 24, 2005

Related U.S. Application Data

(60) Provisional application No. 60/496,366, filed on Aug. 18, 2003.

(51) Int. Cl.
*C08L 33/14* (2006.01)
*C08F 20/26* (2006.01)

(52) U.S. Cl. .............. 524/558; 526/318.4; 526/318.41; 526/318.44; 526/320; 106/493; 106/505

(58) Field of Classification Search .............. 524/558; 526/319, 320, 317.1, 318.4, 318.41, 318.44
See application file for complete search history.

(56) References Cited

U.S. PATENT DOCUMENTS

| | | | | |
|---|---|---|---|---|
| 3,769,247 A | 10/1973 | Glomski et al. | ........... | 260/17 R |
| 4,138,381 A | 2/1979 | Chang et al. | .......... | 260/29.6 TA |
| 4,384,096 A * | 5/1983 | Sonnabend | ................. | 526/313 |
| 4,421,902 A | 12/1983 | Chang et al. | ................ | 526/317 |
| 4,423,199 A | 12/1983 | Chang et al. | ............. | 526/307.6 |
| 4,432,881 A | 2/1984 | Evani | ..................... | 252/8.5 A |
| 4,529,773 A | 7/1985 | Witiak et al. | ................ | 524/558 |
| 4,569,965 A | 2/1986 | Engel et al. | ................. | 524/544 |
| 4,600,761 A | 7/1986 | Ruffner et al. | .............. | 526/270 |
| 4,616,074 A | 10/1986 | Ruffner | ...................... | 526/318 |
| 4,892,916 A | 1/1990 | Hawe et al. | ................. | 526/304 |
| 5,527,614 A * | 6/1996 | Carpenter et al. | ........... | 428/418 |
| 5,770,760 A | 6/1998 | Robinson | .................... | 560/221 |
| 5,874,495 A | 2/1999 | Robinson | | |
| 6,248,805 B1 | 6/2001 | Nguyen et al. | | |
| 6,337,366 B1 | 1/2002 | Amick et al. | ............... | 524/368 |
| 6,355,727 B1 | 3/2002 | Andrist et al. | | |
| 6,602,948 B2 | 8/2003 | Harris et al. | | |
| 6,762,269 B1 | 7/2004 | Maxim, Jr. et al. | | |
| 6,812,278 B2 | 11/2004 | Harris et al. | | |
| 6,887,928 B2 | 5/2005 | Tanzer et al. | | |
| 7,217,443 B2 | 5/2007 | Bobsein et al. | | |
| 2003/0176569 A1 | 9/2003 | Tanzer et al. | | |

FOREIGN PATENT DOCUMENTS

| | | |
|---|---|---|
| EP | 1245644 | 10/2002 |
| EP | 1293545 | 3/2003 |
| EP | 1371688 | 12/2003 |
| GB | 2005697 | 4/1979 |

OTHER PUBLICATIONS

*Kirk-Othmer Encyc. of Chem. Technol.*, 3$^d$ Ed. 1980), John Wiley & Sons, New York 11:963-971.
*Kirk-Othmer Encyc. of Chem. Technol.*, (4$^{th}$ Ed. 1997), John Wiley & Sons, New York 23:483-541.

* cited by examiner

*Primary Examiner*—Vasu Jagannathan
*Assistant Examiner*—Vickey Ronesi
(74) *Attorney, Agent, or Firm*—Kramer Levin Naftalis & Frankel LLP

(57) ABSTRACT

The present invention relates to copolymer surfactants and their use in, e.g., coatings such as latex paint and solvent-based paint, and to a method of dispersing colored pigments using the copolymer surfactant, colorant compositions in which at least one pigment is dispersed by a copolymer surfactant of the invention, a paint which has a colorant composition of the invention, and a method for making a paint having a colorant composition of the invention.

23 Claims, 1 Drawing Sheet

PRECURSOR COLORANT COMPOSITION FOR LATEX PAINT

This application claims the benefit of U.S. provisional application No. 60/496,366, filed Aug. 18, 2003, the disclosure of which is incorporated by reference herein in its entirety.

FIELD OF THE INVENTION

The present invention relates to copolymer surfactants and their use in, e.g., coatings such as latex paint and solvent-based paint, and to a method of dispersing colored pigments using the copolymer surfactant, colorant compositions in which at least one pigment is dispersed by a copolymer surfactant of the invention, a paint which comprises a colorant composition of the invention, and a method for making a paint comprising a colorant composition of the invention.

BACKGROUND OF THE INVENTION

Latex paints have gained market share in architectural coatings, e.g., because of environmental concerns with solvent-based paints. Latex paints have desirable performance in many applications, particularly for architectural coatings. However, there are some properties of latex paints that cannot match those of solvent-based paints. One major concern is controlling the rheology of latex paints as rheology relates to, e.g., their flow and leveling properties. The excellent flow and leveling properties of solvent-based paints can provide a smooth finish that is substantially free of brush marks; this is particularly desirable for high gloss paints. Latex paints have been unable to achieve flow and leveling performance comparable to solvent-based paints because of the limitations of various types of thickeners used in latex paints.

There are several types of thickeners, also known as rheology modifiers or rheology additives, for coatings such as latex paints. One type is the non-associative thickeners made of high molecular weight water-soluble polymers. Non-associative thickeners interact with the aqueous phase of latex paints. Exemplary non-associative thickeners include derivatives comprising cellulose, such as those disclosed in U.S. Pat. No. 3,769,247.

Another type of thickener is known as an associative thickener, such as a hydrophobically modified ethylene oxide urethane rheology modifier ("HEUR"). It is well known that hydrophobic segments of associative thickeners associate with hydrophobic groups of a polymer latex, pigments, and other ingredients of latex paints. Thus, they form a physically cross-linked, shear stress reversible, three-dimensional network.

An additional type of thickener incorporates features of the two types described above by interacting with the aqueous phase while hydrophobically associating with hydrophobic ingredients of latex paints. This type of thickener typically contains hydrophilic polymer chains that interact strongly with water. Attached to these polymer chains are monomers bearing hydrophobic groups that can associate with hydrophobic paint ingredients. Hydrophobically modified alkali swellable/soluble emulsions ("HASE"), each emulsion containing a hydrophobically modified alkali swellable/soluble copolymer ("HASC"), and hydrophobically modified cellulosic thickeners are examples of this type. The number average molecular weight of these dual-acting thickeners is often lower that the number average molecular weight of non-associative thickeners but higher than the number average molecular weight of associative thickeners, such as HEURs.

The good flow and leveling, good shear stability, and minimal impact on water sensitivity are recognized advantages of paints containing HEURs and some latex paints formulated with HEURs can have flow and leveling performance approaching that of solvent paints. However, HEURs are, notably and disadvantageously, very sensitive to the paint's composition. For example, changes in the latex, pigment, surfactant, solvent and/or other paint ingredients can have a profound impact on the viscosity of a paint containing a HEUR.

Colorants are a major factor limiting HEUR's usage in tint-base paints. For example, HEURs can only be used in white paints or in light-color base paints. Deep-color base paints with HEURs are known to have disadvantageous viscosity instability, especially low-shear viscosity instability, after they are tinted, i.e., admixed with a universal color concentrate or colorant composition. Colorant compositions contain organic or inorganic pigments, solvents (which can include water), and a large amount of a so-called "conventional" surfactant or surfactants, i.e., not the copolymer surfactants of the present invention. The conventional surfactant(s) of the colorant compositions interact with HEURs, resulting in an undesirable break-down of physically cross-linked, three-dimensional networks in paints, and thereby significantly decrease the low-shear viscosity of such paints. In the high-shear viscosity range, where the viscosity largely depends on the amount of thickener(s) present in the tint-base, colorants can also reduce the high-shear viscosity through their dilution effect on the tint-base.

U.S. Pat. No. 6,337,366 disclosed a mixture of monophobe and multiphobe modified polyethylene oxide added to colorants to preserve the Stormer viscosity stability of tint-bases.

Using hydrophobically modified alkali soluble polymers as thickeners developed in the 1970s. U.S. Pat. No. 4,138,381 discloses a process of making such polymers through solution polymerization. These are copolymers containing carboxylic acid groups that impart water-solubility to the polymers through neutralization. The hydrophobic segments are alkyl or alkyl phenyl (containing from 1 to 20 carbon atoms) ethylene oxide (meth)acrylate. U.S. Pat. No. 4,138,381 disclosed a process of making polymer thickeners through emulsion polymerization in an aqueous phase; such polymer thickeners are now known as HASE. The latex polymer thus prepared is ready to dissolve in water by adjusting the pH to at least 5.5. Similar systems are disclosed in U.S. Pat. Nos. 4,421,902; 4,423,199; 4,432,881; 4,529,773; 4,569,965; 4,600,761; 4,616,074; and 4,892,916. A hydrophobic monomer known as either tristyrylphenylpoly(ethyleneoxy) methacrylate or tristyrylpoly(ethyleneoxy) methacrylate is disclosed in U.S. Pat. No. 5,770,760.

SUMMARY OF THE INVENTION

In general, the invention relates to a copolymer surfactant comprising at least one surfactant monomer and a plurality of hydrophilic monomers that is useful for, e.g., improved pigment dispersion. These copolymer surfactants are prepared from the following monomers:

(a) from about 10% to about 80% by weight of at least one $C_3$-$C_{12}$ $\alpha,\beta$-ethylenically unsaturated carboxylic acid or anhydride;

(b) from about 10% to about 80% by weight of at least one $C_2$-$C_{12}$, $\alpha,\beta$-ethylenically unsaturated vinyl monomer;

(c) from about 0.01% to about 20% by weight of a surfactant monomer or a combination of surfactant monomers; and (d) optionally, up to about 5% by weight of an ethylenically unsaturated cross-linking monomer.

In another embodiment, the copolymer surfactant consists essentially of the above monomers. In another embodiment, the copolymer surfactant consists of the above monomers.

In another embodiment, the copolymer surfactant is prepared by solution copolymerization or by emulsion copolymerization. The medium for the copolymerization of these monomers can be water or an oxygenated solvent, i.e., an organic molecule containing at least one oxygen atom, such as a glycol. If the medium comprises water, one or more conventional anionic, cationic, nonionic or amphoteric surfactants, or a mixture thereof, can be used to facilitate copolymerization in an emulsion copolymerization.

Another embodiment of the present invention relates to a method of dispersing pigments which uses a copolymer surfactant as described above and/or a conventional HASC copolymer. Another embodiment of the present invention relates to a colorant composition in which at least one pigment is dispersed in water by a copolymer surfactant of the invention and/or a conventional HASC copolymer. Another embodiment of the present invention relates to a colorant composition comprising:

(a) at least one copolymer surfactant of the invention, (b) water, (c) at least one pigment, (d) optionally, an oxygenated solvent, (e) optionally, a low number average molecular weight polymer, such as polyethylene glycol or polypropylene glycol, each with a number average molecular weight below about 1,000 Daltons, as a relatively non-volatile solvent, and (f) optionally, a conventional surfactant, such as an anionic, cationic, nonionic, or amphoteric surfactant, or mixtures of such surfactants.

Another embodiment of the present invention relates to a colorant composition comprising:

(a) a material selected from a copolymer surfactant, a conventional HASC copolymer, or a mixture thereof, (b) water, (c) at least one pigment, (d) optionally, an oxygenated solvent, (e) optionally, a low number average molecular weight polymer, such as polyethylene glycol or polypropylene glycol, each with a number average molecular weight below about 1,000 Daltons, as a relatively non-volatile solvent, and (f) optionally, a conventional surfactant, such as an anionic, cationic, nonionic, or amphoteric surfactant, or mixtures of such surfactants.

Another embodiment of the present invention relates to a method of making a colorant composition comprising admixing a copolymer surfactant of the invention, water and at least one pigment, where the pigment is an organic pigment, an inorganic pigment, or a mixture thereof.

Another embodiment of the present invention relates to a method of making a colorant composition comprising admixing a material selected from a copolymer surfactant, a conventional HASC copolymer, or a mixture thereof, water; and at least one pigment, where the pigment is an organic pigment, an inorganic pigment, or a mixture thereof.

Another embodiment of the present invention relates to a paint, that can be a latex paint or a solvent-based paint, which comprises a tint-base and a colorant composition of the invention.

Another embodiment of the present invention relates to a method of making a paint which comprises admixing a tint-base with a colorant composition of the invention.

DETAILED DESCRIPTION OF THE INVENTION

Figure 1:
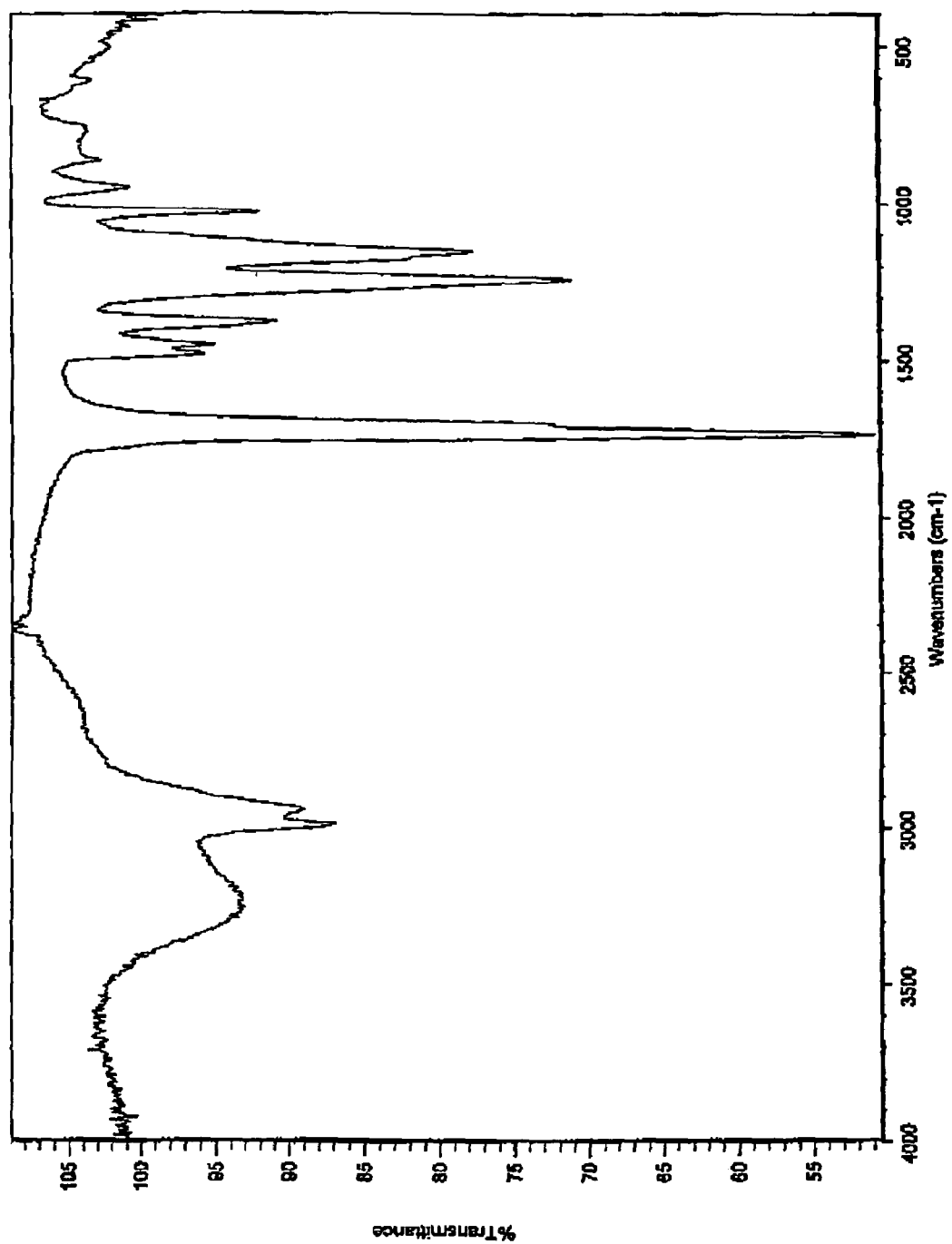
FIG. 1 is an infrared spectrum of the copolymer surfactant of Example 8.

The present invention provides copolymer surfactants and methods of making the same, useful for, e.g., colored pigment dispersion. The invention also relates to colorant compositions or universal color concentrates, which are used to tint water-based and solvent-based paints or coatings. The invention also relates to a method of making a colorant composition. The copolymer surfactant of the present invention is useful in making colorant compositions used for tinting solvent-based paints. The copolymer surfactant of the present invention is useful in making colorant compositions used for tinting latex paints or water-borne coatings containing an associative thickener. Exemplary associative thickeners include nonionic hydrophobically modified ethylene oxide urethane block copolymers, hydrophobically-modified polyethers, hydrophobically-modified alkali soluble emulsions, hydrophobically-modified poly(meth)acrylic acid, hydrophobically-modified hydroxyethyl cellulose, hydrophobically-modified poly(acrylamide), and mixtures thereof.

As used herein, a "copolymer" is a polymer comprising two or more different monomeric subunits. Thus, a polymeric chain comprising three different monomers (also known as a terpolymer) is included within the term "copolymer," as is a polymer chain comprising more than three different monomeric units. As used herein, the term "polymer" includes a homopolymer and a copolymer.

As used herein, "alkyl" means a saturated straight chain or branched non-cyclic hydrocarbon having from 1 to 30 carbon atoms. Representative saturated straight chain alkyls include -methyl, -ethyl, -n-propyl, -n-butyl, -n-pentyl, -n-hexyl, -n-heptyl, -n-octyl, -n-nonyl, -n-decyl and the like. Representative saturated branched alkyls include -isopropyl, -sec-butyl, -isobutyl, -tert-butyl, -isopentyl, -2-methylbutyl, -3-methylbutyl, -2,2-dimethylbutyl, -2,3-dimethylbutyl, -2-methylpentyl, -3-methylpentyl, -4-methylpentyl, -2-methylhexyl, -3-methylhexyl, -4-methylhexyl, -5-methylhexyl, -2,3-dimethylbutyl, -2,3-dimethylpentyl, -2,4-dimethylpentyl, -2,3-dimethylhexyl, -2,4-dimethylhexyl, -2,5-dimethylhexyl, -2,2-dimethylpentyl, -2,2-dimethylhexyl, -3,3-dimethylpentyl, -3,3-dimethylhexyl, -4,4-dimethylhexyl, -2-ethylpentyl, -3-ethylpentyl, -2-ethylhexyl, -3-ethylhexyl, -4-ethylhexyl, -2-methyl-2-ethylpentyl, -2-methyl-3-ethylpentyl, -2-methyl-4-ethylpentyl, -2-methyl-2-ethylhexyl, -2-methyl-3-ethylhexyl, -2-methyl-4-ethylhexyl, -2,2-diethylpentyl, -3,3-diethylhexyl, -2,2-diethylhexyl, -3,3-diethylhexyl and the like.

As used herein, "alkylphenyl" means a phenyl group substituted with at least one alkyl group, where alkyl is as defined above.

As used herein, "styrylphenyl" means a phenyl group substituted with a styryl group, i.e., a vinyl benzene group where the unsubstituted carbon atom of the vinyl is bonded to the phenyl ring. Thus, in the strictest sense, in a monostyrylphenyl group, one vinyl benzene group is bonded to phenyl; in a distyrylphenyl group, two vinyl benzene groups are bonded to phenyl; and in a tristyrylphenyl group, three vinyl benzene groups are bonded to phenyl. However, it is to be understood that as, e.g., a commercially-available tristyrylphenylpoly(ethyleneoxy) (meth)acrylate (i.e., the compound designated by CAS Reg. Number 174200-85-2) can be a mixture of monostyrylphenylpoly(ethyleneoxy) (meth)acrylate, distyrylphenylpoly(ethyleneoxy) (meth)acrylate and/or tristyrylphenylpoly(ethyleneoxy) (meth)acrylate, as used herein, the term "tristyrylphenyl," when used either alone or as a portion of a chemical name and unless otherwise indicated, includes monostyrylphenyl, distyrylphenyl, tristyrylphenyl, or a mixture thereof.

Each copolymer surfactant polymeric backbone chain ("chain") comprises at least one hydrophobe, in another embodiment two or more or hydrophobes, and a plurality of hydrophiles, such as two or more monomer units of an $\alpha,\beta$-ethylenically unsaturated carboxylic acid or anhydride, copolymerized into the copolymer backbone of the copolymer surfactant. The surfactant monomer contributes towards hydrophobicity, e.g., by its alkyl, alkylphenyl, or tristyrylphenyl groups, thereby facilitating the desired association with various types of hydrophobic groups of pigments and of other coating ingredients.

In another embodiment, multiple surfactant monomers are present in a copolymer surfactant chain and provide a plurality or combination of the alkyl, alkylphenyl, or tristyrylphenyl hydrophobic groups.

Hydrophilic groups, such as carboxylic acid and/or anhydride groups, impart solubility to the copolymer surfactant in an aqueous phase, when neutralized, and also facilitate the dispersion of inorganic pigments. Other comonomer components of the copolymer surfactant can be used to adjust the balance between the hydrophobicity and hydrophilicity of the copolymer surfactants.

The copolymer surfactants of the invention contain:

(a) from about 10% to about 80% by weight of at least one $C_3$-$C_{12}$ $\alpha,\beta$-ethylenically unsaturated carboxylic acid or anhydride;

(b) from about 10% to about 80% by weight of at least one $C_2$-$C_{12}$, $\alpha,\beta$-ethylenically unsaturated vinyl monomer;

(c) from about 0.01% to about 20% by weight of at least one surfactant monomer, and (d) optionally, up to 5% by weight of an ethylenically unsaturated cross-linking monomer.

A $C_3$-$C_{12}$ $\alpha,\beta$-ethylenically unsaturated carboxylic acid monomer contains from 3 to 12 carbon atoms and includes mono and dicarboxylic acids, such as acrylic acid, methacrylic acid, crotonic acid, itaconic acid, maleic acid, fumaric acid, angelic acid, glutaconic acid, cinnamic acid, carboxyl cinnamic acid, styrene dicarboxylic acid, and the like. Half-esters of the dicarboxylic acids with alkanols can also be used. In one embodiment, the $C_3$-$C_{12}$ $\alpha,\beta$-ethylenically unsaturated carboxylic acid monomer is acrylic acid, methacrylic acid, crotonic acid, itaconic acid, maleic acid, fumaric acid, angelic acid, glutaconic acid, or a mixture thereof. In another embodiment, the $C_3$-$C_{12}$ $\alpha,\beta$-ethylenically unsaturated carboxylic acid monomer is methacrylic acid, acrylic acid, itaconic acid, or a mixture thereof. In another embodiment, the $C_3$-$C_{12}$ $\alpha,\beta$-ethylenically unsaturated carboxylic acid monomer is methacrylic acid, acrylic acid, or a mixture thereof. Maleic anhydride, 4-vinyl-isobenzofuran-1,3-dione and 5-vinyl-isobenzofuran-1,3-dione are exemplary $C_3$-$C_{12}$ $\alpha,\beta$-ethylenically unsaturated carboxylic anhydrides. In another embodiment, the $C_3$-$C_{12}$ $\alpha,\beta$-ethylenically unsaturated carboxylic anhydride monomer is maleic anhydride. In another embodiment, the $C_3$-$C_{12}$ $\alpha,\beta$-ethylenically unsaturated carboxylic acid or anhydride monomer is maleic anhydride, methacrylic acid, acrylic acid, or a mixture thereof.

In another embodiment, one $C_3$-$C_{12}$ $\alpha,\beta$-ethylenically unsaturated carboxylic acid or anhydride monomer is present in a copolymer surfactant chain. In another embodiment, two $C_3$-$C_{12}$ $\alpha,\beta$-ethylenically unsaturated carboxylic acid or anhydride monomers are present in a copolymer surfactant chain. In another embodiment, three $C_3$-$C_{12}$ $\alpha,\beta$-ethylenically unsaturated carboxylic acid or anhydride monomers are present in a copolymer surfactant chain. It is, of course, to be understood that when two or more $C_3$-$C_{12}$ $\alpha,\beta$-ethylenically unsaturated carboxylic acid or anhydride monomers are present in a copolymer surfactant chain, each monomer can, independently, be an acid or an anhydride.

In another embodiment, one type of $C_3$-$C_{12}$ $\alpha,\beta$-ethylenically unsaturated carboxylic acid or anhydride monomer is present in a copolymer surfactant chain. As used herein in relation to monomers, "type" refers to the chemical structural formula. Thus, each of, e.g., acrylic acid, methacrylic acid, methyl acrylate, methyl methacrylate, ethyl acrylate, ethyl methacrylate and methyl ethacrylate, is a distinct monomer type because each has a unique chemical structural formula. In another embodiment, two types of $C_3$-$C_{12}$ $\alpha,\beta$-ethylenically unsaturated carboxylic acid or anhydride monomers are present in a copolymer surfactant chain. In another embodiment, three types of $C_3$-$C_{12}$ $\alpha,\beta$-ethylenically unsaturated carboxylic acid or anhydride monomers are present in a copolymer surfactant chain. It is, of course, to be understood that when two or more types of $C_3$-$C_{12}$ $\alpha,\beta$-ethylenically unsaturated carboxylic acid or anhydride monomers are present in a copolymer surfactant chain, each monomer can, independently, be an acid or an anhydride.

In another embodiment, one $C_3$-$C_{12}$ $\alpha,\beta$-ethylenically unsaturated carboxylic acid monomer is present in a copolymer surfactant chain. In another embodiment, two $C_3$-$C_{12}$ $\alpha,\beta$-ethylenically unsaturated carboxylic acid monomers, which can, of course, be the same or different, are present in a copolymer surfactant chain. In another embodiment, three $C_3$-$C_{12}$ $\alpha,\beta$-ethylenically unsaturated carboxylic acid monomers, which can, of course, be the same or different, are present in the copolymer surfactant. In another embodiment, one type of $C_3$-$C_{12}$ $\alpha,\beta$-ethylenically unsaturated carboxylic acid monomer is present in a copolymer surfactant chain. In another embodiment, two types of $C_3$-$C_{12}$ $\alpha,\beta$-ethylenically unsaturated carboxylic acid monomers are present in a copolymer surfactant chain. In another embodiment, three types of $C_3$-$C_{12}$ $\alpha,\beta$-ethylenically unsaturated carboxylic acid monomers are present in a copolymer surfactant chain.

In one embodiment, the $C_3$-$C_{12}$ $\alpha,\beta$-ethylenically unsaturated carboxylic acid or anhydride monomer is present, or all of the $C_3$-$C_{12}$ $\alpha,\beta$-ethylenically unsaturated carboxylic acid or anhydride monomers if more than one of such monomers is present, at a concentration of from about 10% to about 80% by weight, based on the total weight of all monomers present in the copolymer surfactant. In another embodiment, the $C_3$-$C_{12}$ $\alpha,\beta$-ethylenically unsaturated carboxylic acid or anhydride monomer is present, or all of the $C_3$-$C_{12}$ $\alpha,\beta$-ethylenically unsaturated carboxylic acid or anhydride monomers if more than one of such monomers is present, at a concentration of from about 15% to about 50% by weight, based on the total weight of all monomers present in the copolymer surfactant. In another embodiment, the $C_3$-$C_{12}$ $\alpha,\beta$-ethylenically unsaturated carboxylic acid is methacrylic acid that is present at a concentration of from about 20% to about 45% by weight, based on the total weight of all monomers present in the copolymer surfactant. In another embodiment, the $C_3$-$C_{12}$ $\alpha,\beta$-ethylenically unsaturated carboxylic acid is acrylic acid that is present at a concentration of from about 20% to about 45% by weight, based on the total weight of all monomers present in the copolymer surfactant.

A $C_2$-$C_{12}$ $\alpha,\beta$-ethylenically unsaturated vinyl monomer contains from 2 to 12 carbon atoms. These include esters of acrylic and methacrylic acid, such as methyl methacrylate, ethyl acrylate, ethyl methacrylate, 2-ethylhexyl acrylate, butyl acrylate, butyl methacrylate, 2-hydroxyethyl acrylate, 2-hydroxybutyl methacrylate and the like; styrenic monomers, such as styrene, vinyltoluene, t-butylstyrene, isopropylstyrene, p-chlorostyrene and the like; vinyl esters, such as vinyl acetate, vinyl butyrate, vinyl caprolate and the like; nitrile monomers, such as acrylonitrile, methacrylonitrile and the like; vinyl chloride; vinylidene chloride; and the like. In another embodiment, the $C_2$-$C_{12}$ α,β-ethylenically unsaturated vinyl monomer is butyl acrylate, ethyl acrylate, ethyl methacrylate, methyl methacrylate, vinyl acetate, acrylonitrile, or a mixture thereof. In another embodiment, the $C_2$-$C_{12}$ α,β-ethylenically unsaturated vinyl monomer is butyl acrylate, ethyl acrylate, ethyl methacrylate, methyl methacrylate, vinyl acetate, or a mixture thereof. In another embodiment, the $C_2$-$C_{12}$ α,β-ethylenically unsaturated vinyl monomer is butyl acrylate, ethyl methacrylate, methyl methacrylate, vinyl acetate, or a mixture thereof. In another embodiment, the $C_2$-$C_{12}$ α,β-ethylenically unsaturated vinyl monomer is butyl acrylate, ethyl methacrylate, vinyl acetate, or a mixture thereof.

In another embodiment, one $C_2$-$C_{12}$ α,β-ethylenically unsaturated vinyl monomer is present in a copolymer surfactant chain. In another embodiment, two $C_2$-$C_{12}$ α,β-ethylenically unsaturated vinyl monomers, which can, of course, be the same or different, are present in a copolymer surfactant chain. In another embodiment, three $C_2$-$C_{12}$ α,β-ethylenically unsaturated vinyl monomers, which can, of course, be the same or different, are present in a copolymer surfactant chain. In another embodiment, four $C_2$-$C_{12}$ α,β-ethylenically unsaturated vinyl monomers, which can, of course, be the same or different, are present in a copolymer surfactant chain. In another embodiment, one type of $C_2$-$C_{12}$ α,β-ethylenically unsaturated vinyl monomer is present in a copolymer surfactant chain. In another embodiment, two types of $C_2$-$C_{12}$ α,β-ethylenically unsaturated vinyl monomers are present in a copolymer surfactant chain. In another embodiment, three types of $C_2$-$C_{12}$ α,β-ethylenically unsaturated vinyl monomers are present in a copolymer surfactant chain. In another embodiment, four types of $C_2$-$C_{12}$ α,β-ethylenically unsaturated vinyl monomers are present in a copolymer surfactant chain.

In one embodiment, the $C_2$-$C_{12}$ α,β-ethylenically unsaturated vinyl monomer is present, or all of the $C_2$-$C_{12}$ α,β-ethylenically unsaturated vinyl monomers if more than one of such monomers is present, at a concentration of from about 10% to about 80% by weight, based on the total weight of all monomers present in the copolymer surfactant. In another embodiment, the $C_2$-$C_{12}$ α,β-ethylenically unsaturated vinyl monomer is present, or all of the $C_2$-$C_{12}$ α,β-ethylenically unsaturated vinyl monomers if more than one of such monomers is present, at a concentration of from about 20% to about 80% by weight, based on the total weight of all monomers present in the copolymer surfactant. In another embodiment, the $C_2$-$C_{12}$ α,β-ethylenically unsaturated vinyl monomer is present, or all of the $C_2$-$C_{12}$ α,β-ethylenically unsaturated vinyl monomers if more than one of such monomers is present, at a concentration of from about 35% to about 75% by weight, based on the total weight of all monomers present in the copolymer surfactant. In another embodiment, the $C_2$-$C_{12}$ α,β-ethylenically unsaturated vinyl monomer is present, or all of the $C_2$-$C_{12}$ α,β-ethylenically unsaturated vinyl monomers if more than one of such monomers is present, at a concentration of from about 50% to about 75% by weight, based on the total weight of all monomers present in the copolymer surfactant. In another embodiment, the $C_2$-$C_{12}$ α,β-ethylenically unsaturated vinyl monomer is butyl acrylate, ethyl methacrylate, methyl methacrylate, vinyl acetate, or a mixture thereof that is present at a concentration of from about 50% to about 75% by weight, based on the total weight of all monomers present in the copolymer surfactant. In another embodiment, the $C_2$-$C_{12}$ α,β-ethylenically unsaturated vinyl monomer is butyl acrylate, ethyl methacrylate, vinyl acetate, or a mixture thereof that is present at a concentration of from about 50% to about 75% by weight, based on the total weight of all monomers present in the copolymer surfactant.

The surfactant monomer is at least one acrylic ester or methacrylic ester, i.e., a (meth)acrylic ester, of an ethoxylated moiety, such as alkyl, alkylphenyl, monostyrylphenyl, distyrylphenyl, tristyrylphenyl and the like, having the structure:

$$H_2C=C(X)-C(O)O\text{-}E\text{-}R \qquad (I)$$

where X is hydrogen or methyl, E is ethoxylate, a hydrophilic moiety, and R is alkyl, alkylphenyl, monostyrylphenyl, distyrylphenyl or tristyrylphenyl, i.e., a hydrophobic moiety. Exemplary surfactant monomers include the acrylic or methacrylic acid esters of nonionic surfactant alcohols, such as alkylpolyethyleneoxy (meth)acrylates or alkylphenylpolyethyleneoxy (meth)acrylates, where the alkyl group contains, independently, from 1 to 30 carbon atoms, and the tristyrylphenylpoly(ethyleneoxy) (meth)acrylates. As previously discussed, it is to be understood that, as used herein, the term "tristyrylphenyl," when used either alone or as a portion of a chemical name and unless otherwise indicated, includes monostyrylphenyl, distyrylphenyl, tristyrylphenyl, or a mixture thereof. In another embodiment, the alkylpolyethyleneoxy (meth)acrylate or alkylphenylpolyethyleneoxy (meth)acrylate has an alkyl group which contains, independently, from 1 to 22 carbon atoms. In another embodiment, the alkylpolyethyleneoxy (meth)acrylate or alkylphenylpolyethyleneoxy (meth)acrylate has an alkyl group which contains, independently, from 9 to 22 carbon atoms.

In another embodiment, the surfactant monomer is nonylpoly(ethyleneoxy) acrylate, decylpoly(ethyleneoxy) acrylate, undecylpoly(ethyleneoxy) acrylate, oleylpoly(ethyleneoxy) methacrylate, behenylpoly(ethyleneoxy) methacrylate, tristyrylphenylpoly(ethyleneoxy) methacrylate, or a mixture thereof. In another embodiment, the surfactant monomer is behenylpoly(ethyleneoxy) acrylate, behenylpoly(ethyleneoxy) methacrylate, decylpoly(ethyleneoxy) acrylate, decylpoly(ethyleneoxy) methacrylate, tristyrylphenylpoly(ethyleneoxy) acrylate, tristyrylphenylpoly(ethyleneoxy) methacrylate, or a mixture thereof. In another embodiment, the surfactant monomer is behenylpoly(ethyleneoxy) methacrylate, decylpoly(ethyleneoxy) acrylate, tristyrylphenylpoly(ethyleneoxy) acrylate, tristyrylphenylpoly(ethyleneoxy) methacrylate, or a mixture thereof. In another embodiment, the surfactant monomer is tristyrylphenylpoly(ethyleneoxy) acrylate, tristyrylphenylpoly(ethyleneoxy) methacrylate, or a mixture thereof. In another embodiment, the surfactant monomer is tristyrylphenylpoly(ethyleneoxy) acrylate. In another embodiment, the surfactant monomer is tristyrylphenylpoly(ethyleneoxy) methacrylate. In each of the above embodiments relating to a surfactant monomer containing (ethyleneoxy) groups, the number of ethylene oxide units present is from about 4 to about 200. Alternatively, in each of the above embodiments relating to a surfactant monomer containing (ethyleneoxy) groups, the number of ethylene oxide units present is from about 4 to about 60. Alternatively, in each of the above embodiments relating to a surfactant monomer containing (ethyleneoxy) groups, the number of ethylene oxide units present is from about 10 to about 40.

In another embodiment, one surfactant monomer unit is present in a copolymer surfactant chain. In another embodiment, two surfactant monomer units, which can, of course, be the same or different, are present in a copolymer surfactant chain. In another embodiment, three surfactant monomer units, which can, of course, be the same or different, are present in a copolymer surfactant chain. In another embodiment, an average of about one surfactant monomer unit is present in a copolymer surfactant chain. In another embodiment, an average of one surfactant monomer unit is present in a copolymer surfactant chain. In another embodiment, an average of from about one to about two surfactant monomer units are present in a copolymer surfactant chain. In another embodiment, an average of at least about two surfactant monomer units are present in a copolymer surfactant chain.

In another embodiment, one type of surfactant monomer is present in a copolymer surfactant chain. In another embodiment, two types of surfactant monomers are present in a copolymer surfactant chain. In another embodiment, three types of surfactant monomers are present in a copolymer surfactant chain.

In one embodiment, the surfactant monomer is present, or all of the surfactant monomers if more than one of such monomers is present, at a concentration of from about 0.01% to about 20% by weight, based on the total weight of all monomers present in the copolymer surfactant. In another embodiment, the surfactant monomer is present, or all of the surfactant monomers if more than one of such monomers is present, at a concentration of from about 0.03% to about 16% by weight, based on the total weight of all monomers present in the copolymer surfactant. In another embodiment, the surfactant monomer is present, or all of the surfactant monomers if more than one of such monomers is present, at a concentration of from about 0.5% to about 13% by weight, based on the total weight of all monomers present in the copolymer surfactant.

Optionally, one or more cross-linking monomers can be used, for example, to modify the molecular weight of a copolymer surfactant. The cross-linking monomers are ethylenically unsaturated monomers comprising a plurality of ethylenically unsaturated groups, such as diallyl phthalate, vinyl crotonate, allyl methacrylate, divinyl benzene, N,N'-methylene-bis-acrylamide, ethylene glycol diacrylate, ethylene glycol dimethacrylate, 1,6-hexanediol diacrylate, and the like. In another embodiment, a cross-linking monomer is absent.

In another embodiment, one cross-linking monomer is present in a copolymer surfactant chain. In another embodiment, two cross-linking monomers, which can, of course, be the same or different, are present in a copolymer surfactant chain. In another embodiment, three cross-linking monomers, which can, of course, be the same or different, are present in a copolymer surfactant chain. In another embodiment, one type of cross-linking monomer is present in a copolymer surfactant chain. In another embodiment, two types of cross-linking monomers are present in a copolymer surfactant chain. In another embodiment, three types of cross-linking monomers are present in a copolymer surfactant chain. In another embodiment, the cross-linking monomer is diallyl phthalate, ethylene glycol diacrylate, or a mixture thereof. In another embodiment, the cross-linking monomer is diallyl phthalate. In another embodiment, the cross-linking monomer is ethylene glycol diacrylate.

In one embodiment, when present, the ethylenically unsaturated cross-linking monomer is present, or all of the ethylenically unsaturated cross-linking monomers if more than one of such monomers is present, at a concentration of up to about 5% by weight, based on the total weight of all monomers present in the copolymer surfactant. In another embodiment, when present, the ethylenically unsaturated cross-linking monomer is present, or all of the ethylenically unsaturated cross-linking monomers if more than one of such monomers is present, at a concentration of up to about 2% by weight, based on the total weight of all monomers present in the copolymer surfactant. In another embodiment, when present, the ethylenically unsaturated cross-linking monomer is present, or all of the ethylenically unsaturated cross-linking monomers if more than one of such monomers is present, at a concentration of up to about 1% by weight, based on the total weight of all monomers present in the copolymer surfactant. In another embodiment, the ethylenically unsaturated cross-linking monomer is diallyl phthalate or ethylene glycol diacrylate and is present at a concentration of up to about 1% by weight, based on the total weight of all monomers present in the copolymer surfactant.

The copolymer surfactants can be prepared by solution copolymerization of the monomers through free-radical, stable free-radical (e.g., using the well-known compound TEMPO), anionic or cationic polymerization in a solvent, such as an oxygenated solvent, or in a mixture of solvents. Glycols are exemplary oxygenated solvents. Exemplary glycols include ethylene glycol, propylene glycol, glycerol, diethylene glycol, triethylene glycol, tetraethylene glycol, and other polyethylene glycols of relatively low number average molecular weight, e.g., below about 1,000 Daltons. Cellosolves and cellosolve derivatives, such as cellosolve acetate, can also be used as the oxygenated solvent.

In one embodiment, the copolymer surfactants are prepared by emulsion copolymerization of the monomers in a continuous aqueous phase emulsion using an emulsifier. This can be done by conventional emulsion polymerization at a pH below about 5.0 using a conventional free-radical producing initiator(s), such as ammonium persulfate, sodium persulfate, potassium persulfate, cumene hydroperoxide, tert-butyl hydroperoxide, benzoyl peroxide, acetyl peroxide, lauroyl peroxide, peracetic acid, perbenzoic acid and/or 2,2'-azobisisobutyronitrile. In another embodiment, the amount of initiator used is from about 0.05% to about 3.5% by weight, based on total weight of all monomers present. In another embodiment, the amount of initiator used is from about 0.75% to about 3.2% by weight, based on total weight of all monomers present. In another embodiment, the polymerization usually is carried out under a relatively inert atmosphere, such as is provided by nitrogen or argon gas, at a temperature of from about 60° C. to about 90° C. Of course, as known to one skilled in the art, higher or lower temperatures can be used depending on the type of initiator(s) present. The polymerization can be carried out in a batch-wise or step-wise manner or with continuous addition of monomers in a conventional manner. The surfactant monomers can be fed simultaneously with other monomers, or be fed after a proportion of other monomers has been reacted.

In one embodiment, at least one anionic, cationic, nonionic or amphoteric emulsifier is used in the emulsion copolymerization in which the copolymer surfactant is prepared. When more than one emulsifier is present, any additional emulsifier is sometimes known as a co-emulsifier. A wide variety of emulsifiers are known to be available, for example, many are listed in *McCutcheon's Emulsifiers & Detergents*, North American Ed., Manufacturing Confectioner Pub. Co., Glen Rock, N.J., 1988, pp. 1-217. The emulsifier can be nonionic, have an anionic charge, have a cationic charge, or have both an anionic and a cationic charge, e.g., an amphoteric emulsifier, where each charge has associated with it a suitable counter ion; numerous examples of each are known in the art. See Lynn, Jr. et al., "Surfactants" in *Kirk-Othmer Encyc. of Chem. Technol.*, 4th Ed., John Wiley & Sons, New York, 1997, Vol. 23, pp. 483-541.

The alkylphenol ethoxylates, such as nonylphenol ethoxylate and the like, are an exemplary class of nonionic emulsifiers. Exemplary anionic emulsifiers include but are not limited to alkali metal alkyl aryl sulfonates, alkali metal alkyl sulfates, the sulfonated alkyl esters, e.g., sodium dodecylbenzene sulfonate, sodium disecondary-butylnaphthalene sulfonate, sodium lauryl sulfate, disodium dodecyldiphenyl ether disulfonate, disodium n-octadecylsulfosuccinamate, sodium dioctylsulfosuccinate, and the like. Exemplary cationic emulsifiers include but are not limited to amines, e.g., aliphatic mono-, di- and polyamines derived from fatty and rosin acids; and quaternary ammonium salts, e.g., dialkyldimethyl and alkyltrimethyl ammonium salts, alkylbenzyldimethyl ammonium chlorides, and alkylpyridinium halides.

Exemplary amphoteric emulsifiers include but are not limited to imidazoline derivatives, such as disodium lauroampho diacetate, disodium cocoampho diacetate, sodium cocoampho acetate, sodium cocoampho propionate, sodium lauroampho acetate, disodium cocoampho dipropionate, cocoampho dipropionic acid, sodium capryloampho carboxylate, sodium cocoampho hydroxypropyl sulfonate, sodium carpryloampho hydroxypropyl sulfonate, and the like; alkyl betaines, such as lauramidopropyl betaines, coco dimethyl betaine, oleamidopropyl betaine, and the like; sultaines, such as alkylether hydroxypropyl sultaine, cocamidopropyl hydroxyl sultaine, and the like; dihydroxyethyl glycinates, such as dihydroxyethyl tallow glycinate and the like; and aminopropionates, such as sodium laurimino dipropionate and the like.

In one embodiment, the emulsifier is of the nonionic type, anionic type, cationic type, amphoteric type, or a mixture thereof. In another embodiment, the emulsifier is of the nonionic type, anionic type, amphoteric type, or a mixture thereof. In another embodiment, the emulsifier contains a sulfonate, a sulfate, an alkylphenol ethoxylate, or a mixture thereof. In another embodiment, the sulfonate emulsifier is sodium dodecylbenzene sulfonate, sodium disecondary-butylnaphthalene sulfonate, sodium cocoampho hydroxypropyl sulfonate, sodium carpryloampho hydroxypropyl sulfonate, or a mixture thereof. In another embodiment, the sulfate emulsifier is sodium lauryl sulfate. In another embodiment, the alkylphenol ethoxylate emulsifier is nonylphenol ethoxylate.

In another embodiment, when a copolymer surfactant is prepared by emulsion polymerization, the amount of emulsifier used is from about 0.2% to about 10% by weight based on the total weight of the emulsion. In another embodiment, when a copolymer surfactant is prepared by emulsion polymerization, the amount of emulsifier used is from about 0.5% to about 10% by weight based on the total weight of the emulsion. In another embodiment, when a copolymer surfactant is prepared by emulsion polymerization, the amount of emulsifier used is from about 0.5% to about 4.0% by weight based on the total weight of the emulsion.

In one embodiment, a copolymer surfactant has a number average molecular weight of from about 400 Daltons to about 500,000 Daltons. In another embodiment, the number average molecular weight of a copolymer surfactant is from about 400 to about 200,000 Daltons. In another embodiment, the number average molecular weight of a copolymer surfactant is from about 1,200 to about 200,000 Daltons.

In another embodiment, the invention relates to a method of dispersing colored pigments in an aqueous phase using a copolymer. In one embodiment, the copolymer is at least one copolymer surfactant of the invention, as described in detail above. In another embodiment, the copolymer is at least one HASC copolymer known in the art, optionally present in an emulsion (i.e., a HASE), such as those disclosed in U.S. Pat. Nos. 4,138,381; 4,421,902; 4,423,199; 4,432,881; 4,529,773; 4,569,965; 4,600,761; 4,616,074; 4,892,916; and the like. In another embodiment, a plurality of copolymers is used; at least one is a copolymer surfactant of the invention and at least one is a HASC copolymer known in the art. In another embodiment, the copolymer is selected from a copolymer surfactant, a conventional HASC copolymer, or a mixture thereof.

In another embodiment, the copolymer surfactant is a mono-hydrophobe, i.e., contains a single hydrophobic group per polymer chain. In another embodiment, the copolymer surfactant contains a plurality (i.e., two or more) of hydrophobes or is a multi-hydrophobe, i.e., contains multiple hydrophobic groups, each of which can be the same or different, per polymer chain. In another embodiment, the copolymer surfactant is a di-hydrophobe and contains two hydrophilic groups, which can be the same or different, per polymer chain. Conventional hydrophobically modified alkali soluble/swellable copolymers (i.e., HASCs) disclosed above are these types of surfactants. Other hydrophobically modified soluble/swellable copolymers commercially available or disclosed in the U.S. Patents mentioned in the previous paragraph are also examples of these copolymer surfactants.

The copolymer surfactants can also be used in combination with other water-soluble polymers, including but not limited to polycarboxylic acids, copolymers comprising monomers containing a carboxylic acid, alkali soluble emulsion polymers, cellulose derivatives, salts of polyacrylic acids, salts of copolymers comprising monomers containing an acrylic acid, polyvinylpyrrolidone, and copolymers comprising vinylpyrrolidone monomer. In another embodiment, the water-soluble polymer is a salt of a polyacrylic acid, a salt of a copolymer comprising a monomer containing an acrylic acid, or a mixture thereof. Conventional emulsifiers or surfactants, i.e., anionic, cationic, nonionic, amphoteric surfactants and mixtures thereof, can also be used with these copolymer surfactants. In one embodiment, a conventional surfactant is absent. In another embodiment, the conventional surfactant is at least one anionic surfactant, nonionic surfactant, amphoteric surfactant, or a mixture thereof. In another embodiment, only a small amount of a conventional surfactant(s) is present, i.e., an amount such that the low-shear viscosity of a latex paint to which a colorant composition the invention is added after addition of the conventional surfactant(s) to that colorant composition is substantially unchanged compared to the low-shear viscosity of the latex paint to which the colorant composition (without conventional surfactant(s)) is added.

Oxygenated solvents, e.g., ethylene glycol, propylene glycol, glycerol, diethylene glycol, triethylene glycol, tetraethylene glycol and many other glycols such as those listed in the *Kirk-Othmer Encyc. of Chem. Technol.*, 3rd Ed., John Wiley & Sons, New York, 1980, Vol. 13, pp. 933-971, and/or low molecular weight polymer glycols, such as polyethylene glycol, polypropylene glycol and the like with a number average molecular weight of less than about 1,000 Daltons, can affect the drying properties of colorant compositions of the invention. At least one of these oxygenated solvents and/or low molecular weight polymer glycols can be present in colorant compositions of the invention, but their use is optional.

Another embodiment of the present invention relates to a colorant composition in which at least one pigment is dispersed in water by a copolymer surfactant of the invention and/or a conventional HASC copolymer. Another embodiment of the present invention relates to a colorant composition comprising:

(a) at least one copolymer surfactant of the invention,
(b) water,
(c) at least one pigment,
(d) optionally, an oxygenated solvent,
(e) optionally, a low number average molecular weight polymer, such as polyethylene glycol or polypropylene glycol, each with a number average molecular weight below about 1,000 Daltons, as a relatively non-volatile solvent, and
(f) optionally, a conventional surfactant, such as an anionic, cationic, nonionic, or amphoteric surfactant, or mixtures of such surfactants.

Another embodiment of the present invention relates to a colorant composition comprising:

(a) a material selected from a copolymer surfactant, a conventional HASC copolymer, or a mixture thereof,
(b) water,
(c) at least one pigment,
(d) optionally, an oxygenated solvent,
(e) optionally, a low number average molecular weight polymer, such as polyethylene glycol or polypropylene glycol, each with a number average molecular weight below about 1,000 Daltons, as a relatively non-volatile solvent, and
(f) optionally, a conventional surfactant, such as an anionic, cationic, nonionic, or amphoteric surfactant, or mixtures of such surfactants.

The optional conventional surfactant of (f) in each of the preceding two embodiments can be any of the classes or species of conventional anionic, cationic, nonionic, or amphoteric emulsifiers described previously herein. In another embodiment, the optional conventional surfactant of (f) can be any of the classes or species of conventional anionic, nonionic, or amphoteric emulsifiers described previously herein.

Another embodiment of the present invention relates to a method of making a colorant composition comprising admixing a copolymer surfactant of the invention, water and at least one pigment, where the pigment is an organic pigment, an inorganic pigment, or a mixture thereof.

Another embodiment of the present invention relates to a method of making a colorant composition comprising admixing a material selected from a copolymer surfactant, a conventional HASC copolymer, or a mixture thereof; water; and at least one pigment, where the pigment is an organic pigment, an inorganic pigment, or a mixture thereof.

The colorant compositions of the invention are so-called universal tinting colorant compositions, that is, they can be used in a water-based latex paint or coating as well as in a solvent-based paint or coating. As known to those in the art, solvent based paints include those containing alkyd resins, amino resins, polyurethanes, oil-modified polyurethanes, epoxy resins, phenolic resins, solvent-borne acrylic resins, polyester resins, drying oils and the like.

Each colored pigment included in a colorant composition of the invention can be an organic pigment or an inorganic pigment; such pigments are well-known in the art. Organic pigments include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds, and the like. Exemplary azo reds include lithols, lithol rubine, toluidine red, naphthol red and quinacridone red. Metallized azo reds are salts containing metal cations, such as barium or calcium salts of azo reds, e.g., calcium lithol rubine and barium lithol red. Nonmetallized azo reds are substantially free of metal cations. Inorganic pigments include titanium dioxide white, carbon black, lampblack, black iron oxide, yellow iron oxide, brown iron oxide, red iron oxide, and the like.

Conventional surfactants and water-soluble polymers are compatible with the copolymer surfactant incorporated into a colorant composition of the invention. To the extent that the copolymer surfactant changes some characteristic of a colorant composition of the invention, such as the compatibility of the colorant composition with tint-base, the rheology profile of the colorant composition, and/or the surface tension of the colorant composition, a small amount of a conventional surfactant(s) and/or a water-soluble polymer(s), e.g., a polymer containing carboxylic groups, can be included, as known to those skilled in the art, to adjust the properties of the colorant composition.

Conventional colorants used for tinting latex paints or coatings contain one or more pigments dispersed and/or stabilized with conventional anionic, cationic, and/or nonionic surfactants. These surfactants typically consist of one "hydrophobic head" and one "hydrophilic tail." For latex paints using associative rheology modifiers and tinted with these colorants, the hydrophobic heads of surfactants originating from the colorant(s) can (1) associate with latex particles, thereby competing with associative rheology modifiers for the latex particle surface, and (2) interact with the hydrophobes of the associative thickener(s) that bridge the chain-portion of these thickeners. If the hydrophilic tails dangle into the aqueous phase, the physically cross-linked networks in the latex paints tend to break down, resulting in significant decrease in low-shear viscosity.

In one embodiment, the copolymer surfactants of the invention are multi-functional, e.g., contain multi-hydrophobic heads and/or multi-hydrophilic tails. The hydrophobe(s) of the copolymer surfactant chain can associate with organic pigments and the electrolytes from neutralization of carboxylic acid groups can interact with inorganic pigments. Through judicious selection of hydrophobe(s) and/or monomers in the copolymer chain, which is familiar to those in the art and, at most, requires only minimal routine experimentation, the copolymer surfactant should be able to emulsify both organic and inorganic pigments in another embodiment. Incorporating the copolymer surfactant of the present invention into a colorant composition can, desirably, significantly reduce the amount of conventional surfactant(s) used in those colorant compositions or even eliminate the need for a conventional surfactant therein.

Another embodiment of the present invention relates to a paint, which can be a latex paint or a solvent-based paint, comprising a tint-base and a colorant composition of the invention. The copolymer surfactant can also interact with latex particles and/or with associative rheology modifiers of a tint-base. Because, in one embodiment, the copolymer surfactant is multi-functional and its copolymer chain is sufficiently long, the copolymer surfactant can associate, on multiple sites of its copolymer chain, with surfaces of latex particles and with "bridging micelles" of associative thickeners. Without wishing to be bound by theory, it is thought that the present copolymer surfactants do not substantially change the low-shear viscosity, e.g., Stormer viscosity, of tinted paints and substantially preserve the network structure of latex paints. In one embodiment, the low-shear viscosity of a paint tinted with a colorant composition of the invention is within about ±10% of the low-shear viscosity of the tint-base from which the paint was formed. In one embodiment, the low-shear viscosity of a paint tinted with a colorant composition of the invention is within about ±5% of the low-shear viscosity of the tint-base from which the paint was formed. In one embodiment, the low-shear viscosity of a paint tinted with a colorant composition of the invention is within about ±3% of the low-shear viscosity of the tint-base from which the paint was formed.

Another advantage of the present copolymer surfactant is the ease with which the rheology of a colorant composition of the invention can be controlled without substantially impacting the rheology profile, e.g., the ICI viscosity, of a tint-base. Therefore, the excellent flow and leveling properties that HEURs impart to latex paints containing them should not be affected. In addition, the copolymer surfactant of the invention can have minimal impact on the gloss of a tint-base. Many commercial colorants include silicates to adjust the viscosity of the colorant. However, silicates can also decrease the high-shear viscosity of latex paints containing either associative or non-associative thickeners because such colorants dilute the thickeners used in tint-base and the high-shear viscosity of the tint-base is very dependent upon the amount of thickener(s) present. Also, silicates in the colorant can reduce the gloss of a tint-base to which such colorant is added. However, in colorant compositions including a copolymer surfactant of the invention as a colored pigments dispersant, the colorant composition should have little influence on the tint-base gloss level and/or high-shear viscosity. In one embodiment, the high-shear viscosity of a paint tinted with a colorant composition of the invention is within about ±10% of the high-shear viscosity of the tint-base from which the paint was formed.

A further advantage of the present copolymer surfactant is its minimal influence on the flow/leveling properties of a paint of the invention, containing a colorant composition of the invention. In one embodiment, a paint of the invention has a flow/level rating, measured at 25° C. according to ASTM Standard D4062-99, of at least 8 on a scale of from 1 to 10, with 10 being the best flow/level characteristics. In another embodiment, a paint of the invention has a flow/level rating, measured in the same way, of about 9. In another embodiment, a paint of the invention has a flow/level rating, measured in the same way, of about 10. In another embodiment, a paint of the invention has a flow/level rating, measured in the same way, of 10.

Another embodiment of the present invention relates to a method of making a paint which comprises admixing a tint-base with a colorant composition of the invention.

EXAMPLES

As noted above, the copolymer surfactants of the invention impart advantageous performance to, e.g., coatings, such as latex paint, comprising a copolymer surfactant of the invention and colorant compositions in which at least one pigment is dispersed by a copolymer surfactant of the invention.

The following examples further illustrate certain embodiments of the present invention. These examples are provided solely for illustrative purposes and in no way limit the scope of the present invention. It is noted that, because of rounding, the sum of the amounts of each ingredient present may not equal the total in every case.

Example 1

Preparation of Copolymer Surfactant (1)

The emulsion polymerization reaction is carried out in a four-neck flask of about 4 L (1 U.S. gallon) capacity under nitrogen purge. The reaction flask is equipped with a condenser, a thermometer, an agitator and a feeding pump. The flask is immersed in a temperature controlled water bath maintained at a constant temperature within about ±0.1° C. of the set point. Table 1 shows the ingredients used for the copolymer surfactant and in its preparation:

TABLE 1

| Ingredients for Preparation of Copolymer Surfactant (1) | |
|---|---|
| Component | Parts (by weight) |
| Initial Charge in Reactor | |
| Deionized water | 47.2 |
| Ammonium nonylphenyl ether persulfate (CO 436) | 0.1 |
| Monomer Emulsion | |
| Deionized water | 12.1 |
| Nonylphenol ethoxylate (CO 630) | 1.3 |
| Methacrylic acid | 11.8 |
| Vinyl acetate | 10.8 |
| Butyl acrylate | 6.7 |
| Tristyrylphenylpoly(ethyleneoxy) methacrylate | 0.4 |
| Diallyl phthalate | 0.03 |
| Initiator Solution 1 | |
| Ammonium persulfate | 0.1 |
| Deionized water | 2.0 |
| Initiator Solution 2 | |
| Ammonium persulfate | 0.1 |
| Deionized water | 3.1 |
| Ammonium nonylphenyl ether persulfate | 0.2 |
| Rinse | |
| Deionized water | 4.0 |
| Total | 99.93 |

Deionized water and the surfactant ammonium nonylphenyl ether persulfate (CO 436, obtained from Rhodia Inc. (Cranbury, N.J.)) were charged into the reaction flask and its contents were heated to 80° C. At 80° C., 6% of monomer emulsion, containing the surfactant nonylphenol ethoxylate, comprising 9 moles of ethylene oxide per mole of surfactant (CO 630, obtained from Rhodia Inc.) was charged into the reaction flask and held for 10 minutes. Thereafter, initiator solution 1 was charged into the reaction flask and held for 15 minutes. Initiator solution 2 and the remaining monomer emulsion were then fed into the reaction flask over a period of from about 3 to about 4.5 hours. After feeding was complete, the feeding line was rinsed or flushed with water; the rinse water also entered the reaction flask. The temperature of the reaction flask was maintained at 80-85° C. for one hour after which it was cooled to about 25° C. and the copolymer surfactant product, in the form of a latex or emulsion, was recovered. The copolymer surfactant had a number average molecular weight of about 100,000 Daltons.

It was noted that upon addition of a base, such as ammonia or sodium hydroxide, the copolymer surfactant of the latex dissolved in the aqueous phase, thereby indicating that the latex containing this copolymer surfactant is a HASE.

The product copolymer surfactant was characterized as a mono-hydrophobic and multi-hydrophilic alkali soluble copolymer surfactant.

Example 2

Preparation of Copolymer Surfactant (2)

The procedures and conditions in this example were the same as in Example 1 except that Table 2 shows the ingredients used for the copolymer surfactant and in its preparation:

TABLE 2

Ingredients for Preparation of Copolymer Surfactant (2)

| Component | Parts (by weight) |
|---|---|
| Initial Charge in Reactor | |
| Deionized water | 46.4 |
| Ammonium nonylphenyl ether persulfate | 0.1 |
| Monomer Emulsion | |
| Deionized water | 13.9 |
| Ammonium nonylphenyl ether persulfate | 0.5 |
| Mixed surfactant (ABEX 2020) | 1.2 |
| Methacrylic acid | 9.6 |
| Vinyl acetate | 8.5 |
| Butyl acrylate | 3.6 |
| Ethyl methacrylate | 5.3 |
| Tristyrylphenylpoly(ethyleneoxy) methacrylate | 2.9 |
| Ethylene glycol diacrylate | 0.03 |
| Initiator Solution 1 | |
| Ammonium persulfate | 0.06 |
| Deionized water | 2.6 |
| Initiator Solution 2 | |
| Ammonia persulfate | 0.07 |
| Deionized water | 3.0 |
| Ammonium nonylphenyl ether persulfate | 0.13 |
| Mixed surfactant (ABEX 2020) | 0.3 |
| Rinse | |
| Deionized water | 1.8 |
| Total | 100.0 |

The ABEX 2020 mixed surfactant used was a proprietary formulation obtained from Rhodia Inc. and is believed to comprise a mixture of an anionic surfactant and a nonionic surfactant. The product copolymer surfactant was characterized as a multi-hydrophobe modified alkali soluble copolymer surfactant

Example 3

Preparation of Copolymer Surfactant (3)

The procedures and conditions in this example were the same as in Example 1 except that Table 3 shows the ingredients used for the copolymer surfactant and in its preparation:

TABLE 3

Ingredients for Preparation of Copolymer Surfactant (3)

| Component | Parts (by weight) |
|---|---|
| Initial Charge in Reactor | |
| Deionized water | 49.4 |
| Ammonium nonylphenyl ether persulfate | 0.1 |
| Monomer Emulsion | |
| Deionized water | 13.9 |
| Ammonium nonylphenyl ether persulfate | 0.4 |
| Mixed surfactant (ABEX 2020) | 1.2 |
| Methacrylic acid | 9.8 |
| Vinyl acetate | 9.8 |
| Ethyl methacrylate | 9.8 |
| Tristyrylphenylpoly(ethyleneoxy) methacrylate | 0.6 |
| Initiator Solution 1 | |
| Ammonium persulfate | 0.03 |
| Deionized water | 0.7 |
| Initiator Solution 2 | |
| Ammonia persulfate | 0.04 |
| Deionized water | 2.0 |
| Ammonium nonylphenyl ether persulfate | 0.14 |
| Mixed surfactant (ABEX 2020) | 0.3 |
| Rinse | |
| Deionized water | 1.5 |
| Total | 99.71 |

Example 4

Preparation of Copolymer Surfactant (4)

The procedures and conditions in this example were the same as in Example 1 except that the tristyrylphenylpoly(ethyleneoxy) methacrylate was replaced with 1.2 parts of behenylpoly(ethyleneoxy) methacrylate.

Example 5

Preparation of Copolymer Surfactant (5)

The procedures and conditions in this example were the same as in Example 2 except that the tristyrylphenylpoly(ethyleneoxy) methacrylate was replaced with decylpoly(ethyleneoxy) acrylate.

Example 6

Preparation of Copolymer Surfactant (6)

In this example, a plurality of hydrophobes was used. The procedures and conditions in this example were the same as in Example 3 except that the monomers in the monomeric emulsion were as follows:
- 10 parts of methacrylic acid,
- 9.2 parts of vinyl acetate,
- 9.2 parts of ethyl methacrylate,
- 1.9 parts of decylpoly(ethyleneoxy) acrylate, and
- 0.18 parts of behenylpoly(ethyleneoxy) methacrylate.

Example 7

Preparation of Copolymer Surfactant (7)

In this example, a plurality of hydrophobes was used. The procedures and conditions in this example were the same as in Example 3 except that the monomers in the monomeric emulsion were as follows:
- 12 parts of methacrylic acid,
- 9 parts of vinyl acetate,
- 9 parts of ethyl methacrylate, 1.6 parts of tristyrylphenylpoly(ethyleneoxy) methacrylate, and 0.21 parts of behenylpoly(ethyleneoxy) methacrylate.

Example 8

Preparation of Copolymer Surfactant (8)

In this example, two stages were used and a surfactant monomer was fed during the second stage. The procedures and conditions in this example were the same as in Example 7 except that the surfactant monomer was 1.03 parts of tristyrylphenylpoly(ethyleneoxy) methacrylate and the tristyrylphenylpoly(ethyleneoxy) methacrylate was added to the monomer emulsion after about half of the monomer emulsion had been added to reaction flask.

An infrared spectrum of the copolymer surfactant of this example is provided in FIG. 1.

Example 9

Magenta and Organic Red Colorant Composition (1)

A colorant composition comprising magenta, organic red and a copolymer surfactant of the invention was prepared. The copolymer surfactant that was used is described in Example 3. It was added to the dispersion in the latex form in which it was prepared in Example 3. Table 4 shows the ingredients used in the magenta and organic red colorant composition.

TABLE 4

Magenta and Organic Red Colorant Composition (1)

| Component | Parts (by weight) |
| --- | --- |
| Water | 76.7 |
| Copolymer surfactant of Example 3 | 7.6 |
| Sodium hydroxide (50% aqueous solution) | 1.0 |
| Defoamer (L475) | 0.6 |
| Preservative (NUOSEPT 95) | 0.3 |
| Magenta | 12.6 |
| Organic red | 1.3 |
| Total: | 100 |

The conventional defoamer used, DREWPLUS L475, was obtained from Ashland Specialty Chemical Co. (Columbus, Ohio). The conventional preservative used, NUOSEPT 95, was obtained from Creanova Inc. (Wayne, N.J.).

The colorant composition was prepared as follows. To a 1 L stainless steel beaker, equipped with a stirrer that stirred under slow agitation at about 500 rpm, was added in the following order: water, copolymer surfactant emulsion from Example 3 and sodium hydroxide solution. When the solution became clear, the L-475 defoamer and NUOSEPT 95 preservative were added and mixing continued at about 500 rpm for 10 minutes. The mixing speed was increased to about 1,000 rpm, then the powdered pigments, i.e., magenta and organic red, were added. After addition of the pigments was complete, the mixing rate was increased to about 2,500 rpm and mixing continued for about 45 minutes at that speed until the mixture appeared to be a homogenous dispersion. The mixture was then processed through a sand mill (Model L-3-J, Chicago Boiler Co., Buffalo Grove, Ill.) using 1.00 mm diameter glass beads as the grinding media.

Colorant Composition (1) performed satisfactorily. This example demonstrates, e.g., that a copolymer surfactant of the invention was an effective dispersant and stabilizer for organic pigments, such the magenta and organic red of the example.

Example 10

White Colorant Composition (2)

A colorant composition comprising a white pigment and a copolymer surfactant of the invention was prepared. The copolymer surfactant that was used is described in Example 3. It was added to the dispersion in the latex form in which it was prepared in Example 3. Table 5 shows the ingredients used in the white colorant composition.

TABLE 5

Titanium Dioxide White Colorant Composition (2)

| Component | Parts (by weight) |
| --- | --- |
| Water | 23.8 |
| Copolymer surfactant of Example 3 | 4.9 |
| Polyethylene glycol 400 | 2.6 |
| Sodium hydroxide (50% aqueous solution) | 0.4 |
| Defoamer (L475) | 0.7 |
| Preservative (NUOSEPT 95) | 0.3 |
| Titanium dioxide | 67.3 |
| Total: | 100 |

The solvent polyethylene glycol 400, i.e., an ethylene glycol solvent with a number average molecular weight of about 400 Daltons, was used as a component of Colorant Composition (2).

The white colorant composition was prepared by the same procedure described in Example 9 except that processing through the sand mill was omitted and, of course, a different pigment was used.

Colorant Composition (2) performed satisfactorily. This example demonstrates, e.g., that a copolymer surfactant of the invention was an effective dispersant and a stabilizer for an inorganic pigment, such as titanium dioxide.

Example 11

Colorant Composition (3)

A colorant composition comprising a copolymer surfactant of the invention, used in combination with a copolymer alkoxylate and a salt of a water-soluble copolymer, was prepared. The colorant composition was prepared by the same procedure described in Example 9 except that 0.75 parts of the sodium salt of the commercially-available copolymer containing acrylic acid BYK 155 (obtained from BYK-Chemie USA Inc.; Wallingford, Conn.) and 1.5 parts of the copolymer alkoxylate SOLSPERSE 27000 (obtained from Avecia Inc., Wilmington, Del.) were also added to the colorant composition.

Colorant Composition (3) performed satisfactorily. This example demonstrates, e.g., that colorant compositions of the invention, comprising copolymer surfactant of the invention, can further comprise a conventional water-soluble polymer or polymers.

Example 12

Yellow Colorant Composition (4)

A colorant composition comprising a yellow pigment and a copolymer surfactant of the invention, used in combination with a conventional surfactant, was prepared. The copolymer surfactant that was used is described in Example 3. It was added to the dispersion in the latex form in which it was prepared in Example 3. Table 6 shows the ingredients used in the yellow colorant composition.

TABLE 6

Yellow Iron Oxide Colorant Composition (4)

| Component | Parts (by weight) |
|---|---|
| Water | 36.7 |
| Copolymer surfactant of Example 3 | 4.4 |
| Anionic surfactant solution (BYK 190, 40% solids aqueous solution) | 3 |
| Polyethylene glycol 400 | 5 |
| Sodium hydroxide (50% aqueous solution) | 0.5 |
| Defoamer (L475) | 0.6 |
| Preservative (NUOSEPT 95) | 0.3 |
| Yellow iron oxide | 49.5 |
| Total: | 100 |

The conventional anionic surfactant BYK 190, used as a 40% solids aqueous solution, was obtained from BYK-Chemie USA Inc.

The yellow colorant composition was prepared by the same procedure described in Example 10 except that, of course, a different pigment was used.

Colorant Composition (4) performed satisfactorily. This example demonstrates, e.g., that colorant compositions of the invention, comprising a copolymer surfactant of the invention, can further comprise a conventional surfactant or surfactants.

Example 13

Acrylic Latex Paint Base Containing HEURs

The formulation for an acrylic semi-gloss tint-base latex, i.e., a latex base paint or an untinted latex, comprising HEURs, is shown Table 7.

TABLE 7

Untinted Acrylic Semi-Gloss Latex Paint

| Component | Parts (by weight) |
|---|---|
| Water | 18 |
| Propylene glycol | 4 |
| Hydroxyethylcellulose | 0.5 |
| Dispersant (TAMOL 681) | 0.75 |
| Calcium carbonate | 20 |
| Defoamer (FOAMASTER PL) | 0.1 |
| Preservative (NUOSEPT 95) | 2 |
| Surfactant (TRITON X-100) | 0.5 |
| Propylene glycol | 1 |
| Ester alcohol (TEXANOL) | 2.5 |
| Ammonia | 0.25 |
| Acrylic latex binder (SG-10M) | 59 |
| Rheology additive (RM-2020) | 3.5 |
| Rheology additive (RM-825) | 1.06 |
| Water | 6.8 |
| ISOPAR L | 1 |
| Defoamer (FOAMASTER PL) | 0.75 |

The hydroxyethylcellulose used, NATROSOL Plus 250 MBR, was obtained from Hercules Inc. (Wilmington, Del.). The conventional hydrophobic copolymer dispersant used, TAMOL 681, was obtained from Rohm & Haas (Philadelphia, Pa.). The conventional defoamer used, FOAMASTER PL, was obtained from Cognis Corp. (Cincinnati, Ohio). The conventional polyethylene glycol-based surfactant used, TRITON X-100, was obtained from Union Carbide/Dow Chemical Co. (Danbury, Conn.). The conventional ester alcohol used, TEXANOL, believed to consist essentially of 2,2, 4-trimethyl-1,3,-pentanediol monoisobutyrate, was obtained from Eastman (Kingsport, Tenn.). The conventional acrylic latex binder used, SG-10M, and rheology additives used, RM-2020 and RM-825, were obtained from Rohm & Haas.

The tint-base was prepared as follows. To a 1 L stainless steel beaker, equipped with a stirrer that stirred under slow agitation at about 500 rpm, was added the indicated quantities of the first seven ingredients in Table 7, i.e., water, propylene glycol, hydroxyethylcellulose, dispersant, calcium carbonate, defoamer and preservative. The mixing speed was increased to about 2,000 rpm for about 10 minutes, which, without wishing to be bound by theory, is thought to grind the components. Thereafter, the mixing speed was decreased to about 500 rpm and the indicated quantities of the remaining ingredients in Table 7, i.e., surfactant, propylene glycol, ester alcohol, ammonia, acrylic latex binder SG-10M, rheology additive RM-2020, rheology additive RM-825, water, ISOPAR L and defoamer, were added in the order given in the table. After the addition was complete, the mixing rate was increased to about 1,000 rpm and mixing continued for about 10 minutes at that speed.

The latex base paint had a Stormer viscosity, measured at 25° C., of 95 Krebs Units. The Stormer Viscosity was determined according to ASTM Standard D562-01, "Standard Test Method for Consistency of Paints Measuring Krebs Unit (KU) Viscosity Using a Stormer-Type Viscometer," using a Brookfield Viscometer model KU-1 obtained from BYK-Gardner USA (Rivers Park II, Md.).

The latex base paint had an ICI viscosity, measured at 25° C., of 1.1 poise. The ICI. viscosity was determined according to ASTM Standard D4287-00, "Standard Test Method for High-Shear Viscosity Using a Cone/Plate Viscometer," using an ICI Cone/Plate Digital Viscometer model CAP 1000 (obtained from BYK-Gardner USA)., The latex base paint had a flow/level rating, measured at 25° C., of 10, on a scale of from 1 to 10 with 10 being the best flow/level characteristics. The flow/level characteristics were determined from draw-downs according to ASTM Standard D4062-99, "Standard Test Method for Leveling of Paints by Draw-Down Method." A Leneta Leveling Test Blade (LTB-2) and Leneta Draw-Down Charts (Form 18B), each obtained from the Leneta Company (Mahwah, N.J.), were used for these tests. The draw-downs were evaluated visually and assigned a rating of from 1 to 10, as specified in ASTM D4062.

The untinted latex of Example 13 is used in the following example, where colorant compositions are admixed therewith.

Example 14

Acrylic Latex Paints Tinted with Colorant Compositions of the Invention

Aliquots of the untinted base described in Example 13 were tinted with colorant compositions of the invention by admixing about 355 mL (about 12 fluid ounces) of each colorant and about 3.43 L (about 116 fluid ounces) of the untinted paint. Control tinted paints were also prepared from the untinted paint of Example 13 by admixing about 355 mL (about 12 fluid ounces) of a commercial colorant, comprising the same pigment but only conventional surfactant(s), and about 3.43 L (about 116 fluid ounces) of the untinted paint.

The Stormer viscosity (low-shear) and the ICI viscosity (high-shear) of each tinted paint was measured at 25° C. by the methods described in Example 13. The changes in Stormer viscosity and ICI viscosity upon tinting, i.e., [(viscosity tinted paint)−(viscosity untinted paint)], as compared with the corresponding control, are shown in Tables 8 and 9, respectively.

TABLE 8

Changes in Stormer Viscosity (KU) of Tinted Paints Relative to Untinted Base

| Pigment or Pigments in Colorant | With Colorant Composition of the Invention Comprising Copolymer Surfactant | With Commercial Control Colorant Comprising Prior-art Surfactant |
|---|---|---|
| Red iron oxide | 0 | −31 |
| Yellow iron oxide | 0 (Example 12) | −31 |
| Titanium oxide white | 0 (Example 10) | −33 |
| Carbon black | +2 | −29 |
| Magenta and organic red | −1 (Example 11) | −33 |
| Phthalocyanine blue | +1 | −24 |

TABLE 9

Changes in ICI Viscosity (poise) in Tinted Paints Relative to Untinted Base

| Pigment or Pigments in Colorant | With Colorant Composition of the Invention Comprising Copolymer Surfactant | With Commercial Control Colorant Comprising Prior-art Surfactant |
|---|---|---|
| Red iron oxide | −0.02 | −0.36 |
| Yellow iron oxide | −0.05 (Example 12) | −0.34 |
| Titanium oxide white | −0.06 (Example 10) | −0.41 |
| Carbon black | −0.01 | −0.42 |
| Magenta and organic red | −0.06 (Example 11) | −0.43 |
| Phthalocyanine blue | −0.10 | −0.13 |

It should be noted that each colorant composition of the invention referred to by example number in Tables 8 and 9 may not be of the specific batch whose preparation is described in that example, however, the colorant composition of the invention mixed with the untinted paint is substantially identical to the preparation described in the referenced example. The commercial colorants used as the controls in Tables 8 and 9 contain no copolymer surfactant but primarily contain the prior-art surfactant isopropyl amine dodecyl benzene sulfonate as their dispersant.

Each paint in Tables 8 and 9 tinted with a colorant composition of the invention had a rating of 10 for flow/level, as determined by the method described in Example 13.

Example 15

Alkyd Solvent-Based Paint Tinted with a Colorant Composition of the Invention An untinted solvent-based base paint was tinted with a colorant composition of the invention in the following example.

The solvent-based untinted base used was a commercial product: Benjamin Moore & Co. (Montvale, N.J.) SATIN IMPERVO® Alkyd Low Lustre Enamel, Ultra Base, C235 4B, Lot Number 304320. This base is a soya alkyl tint-base that uses isoparaffin as the solvent. About 3.43 L (about 116 fluid ounces) of this base was tined with about 355 mL (about 12 fluid ounces) of Colorant Composition (1) of Example 9 by admixing the two fluids.

The tinted solvent-based paint was evaluated for color compatibility, or "rub-up" as known in the paint art. A bird-type film applicator (i.e., a draw-down bar) that provided a 6 inch wide film of 0.04 inches wet film thickness was used to make a draw-down of the tinted paint onto a draw-down card (obtained from the Leneta Company). About 10 minutes after drawing-down, when the paint became tacky but not dry, a portion of paint on the draw-down cart was rubbed-up with a finger, clockwise, for 20 circles. A visual evaluation indicated that the rubbed-up area had substantially the same color as the unrubbed area on the card.

All publications and patent applications are herein incorporated by reference to the same extent as if each individual publication or patent application was specifically and individually indicated to be incorporated by reference.

Unless otherwise noted, all percent and parts values given herein are by weight, i.e., weight percent (wt. %) and parts by weight.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A colorant composition suitable as a precursor to an aqueous latex paint, which colorant composition consists essentially of at least one pigment, water, and a copolymer surfactant having a number average molecular weight of from about 400 Daltons to about 200,000 Daltons comprising the following monomers
   (a) from about 10% to about 80% by weight of at least one $C_3$-$C_{12}$ α,β-ethylenically unsaturated carboxylic acid or anhydride,
   (b) from about 10% to about 80% by weight of at least one $C_2$-$C_{12}$ α,β-ethylenically unsaturated vinyl monomer, and
   (c) from about 0.01% to about 20% by weight of at least one surfactant monomer, wherein each said surfactant monomer is either an acrylic or methacrylic ester moiety joined with a hydrophobic moiety which is styrylphenyl by a bridging group consisting essentially of a poly (ethyleneoxy) moiety,
   which colorant composition is not itself an aqueous latex paint, and which colorant composition is capable of causing the Stormer low-shear viscosity of an aqueous latex paint formed of a mixture comprising said composition and a tint-base to be within about ±10% of the Stormer low-shear viscosity of said tint-base.

2. The colorant composition of claim 1, which further includes at least one oxygenated solvent.

3. The colorant composition of claim 1, wherein the copolymer surfactant is formed of the following monomers
   (a) from about 10% to about 80% by weight of methacrylic or acrylic acid,
   (b) from about 10% to about 80% by weight of ethyl methacrylate, and vinyl acetate, and
   (c) from about 0.01% to about 20% by weight tristyrylphenylpoly(ethyleneoxy) methacrylate.

4. The colorant composition of claim 1, wherein the copolymer surfactant comprises two surfactant monomers which are the same or different.

5. The colorant composition of claim 1, wherein each said surfactant monomer is either an acrylic or methacrylic ester moiety joined with a hydrophobic moiety selected from the group consisting of monostyrylphenyl, distyrylphenyl and tristyrylphenyl by a bridging group consisting essentially of a poly(ethyleneoxy) moiety.

6. The colorant composition of claim 5, wherein the poly(ethyleneoxy) moiety has from about 4 to about 200 ethyleneoxy units.

7. A method of making the colorant composition of claim 1 consisting essentially of admixing said copolymer surfactant, water and said at least one pigment, wherein said at least one pigment is one or more organic pigments, one or more inorganic pigments, or a mixture of one or more organic pigments and one or more inorganic pigments.

8. The method of claim 7, wherein the colorant composition further includes at least one conventional surfactant.

9. The method of claim 8, wherein the conventional surfactant is an anionic surfactant, a nonionic surfactant, an amphoteric surfactant, or a mixture thereof.

10. The method of claim 7, wherein the colorant composition further includes a water-soluble polymer selected from a polycarboxylic acid, a copolymer comprising a monomer containing a carboxylic acid, an alkali soluble emulsion polymer, a cellulose derivative, a salt of a polyacrylic acid, a salt of a copolymer comprising a monomer containing an acrylic acid, polyvinylpyrrolidone, a copolymer comprising vinylpyrrolidone monomer, or a mixture thereof.

11. The method of claim 10, wherein the water-soluble polymer is a salt of a polyacrylic acid, a salt of a copolymer comprising a monomer containing an acrylic acid, or a mixture thereof.

12. The method of claim 7, wherein the inorganic pigment is titanium dioxide white, carbon black, lampblack, black iron oxide, yellow iron oxide, brown iron oxide, red iron oxide, or a mixture thereof.

13. The method of claim 7, wherein the organic pigment is phthalocyanine blue, phthalocyanine green, monoarylide yellow, diarylide yellow, benzimidazolone yellow, heterocyclic yellow, DAN orange, quinacridone magenta, quinacridone violet, organic red, or a mixture thereof.

14. The method of claim 13, wherein the organic red is metallized azo red, a nonmetallized azo red, or a mixture thereof.

15. The colorant composition as defined in claim 1, wherein the copolymer surfactant is formed of the following monomers
   (a) from about 10% to about 80% by weight of methacrylic or acrylic acid,
   (b) from about 10% to about 80% by weight of a first vinyl ester which is alkyl methacrylate, the alkyl of which is of from 2 to 12 carbon atoms, and a second vinyl ester of from 2 to 12 carbon atoms, and
   (c) from about 0.01% to about 20% by weight of at least one surfactant monomer, wherein each said surfactant monomer is either an acrylic or methacrylic ester moiety joined with a hydrophobic moiety which is tristyrylphenyl by a bridging group consisting essentially of a poly(ethyleneoxy) moiety.

16. A method of making the colorant composition of claim 15 consisting essentially of admixing said copolymer surfactant, water and said at least one pigment, wherein said at least one pigment is one or more organic pigments, one or more inorganic pigments, or a mixture of one or more organic pigments and one or more inorganic pigments.

17. A method of claim 16, wherein the colorant composition further includes at least one conventional surfactant.

18. The method of claim 17, wherein the conventional surfactant is an anionic surfactant, a nonionic surfactant, an amphoteric surfactant, or a mixture thereof.

19. The method of claim 16, wherein the colorant composition further includes a water-soluble polymer selected from a polycarboxylic acid, a copolymer comprising a monomer containing a carboxylic acid, an alkali soluble emulsion polymer, a cellulose derivative, a salt of a polyacrylic acid, a salt of a copolymer comprising a monomer containing an acrylic acid, polyvinylpyrrolidone, a copolymer comprising vinylpyrrolidone monomer, or a mixture thereof.

20. The method of claim 19, wherein the water-soluble polymer is a salt of a polyacrylic acid, a salt of a copolymer comprising a monomer containing an acrylic acid, or a mixture thereof.

21. The method of claim 16, wherein the inorganic pigment is titanium dioxide white, carbon black, lampblack, black iron oxide, yellow iron oxide, brown iron oxide, red iron oxide, or a mixture thereof.

22. The method of claim 16, wherein the organic pigment is phthalocyanine blue, phthalocyanine green, monoarylide yellow, diarylide yellow, benzimidazolone yellow, heterocyclic yellow, DAN orange, quinacridone magenta, quinacridone violet, organic red, or a mixture thereof.

23. The method of claim 22, wherein the organic red is metallized azo red, a nonmetallized azo red, or a mixture thereof.

* * * * *